(12) United States Patent
Erickson et al.

(10) Patent No.: US 10,816,571 B1
(45) Date of Patent: Oct. 27, 2020

(54) SCANNED PROBE MOUNTING DESIGN

(71) Applicants: Andrew Norman Erickson, Santa Barbarba, CA (US); Kyle Alfred Hofstatter, Santa Barbara, CA (US)

(72) Inventors: Andrew Norman Erickson, Santa Barbarba, CA (US); Kyle Alfred Hofstatter, Santa Barbara, CA (US)

(73) Assignee: Angstrom Science, Inc., Santa Barbara, CA (US)

( * ) Notice: Subject to any disclaimer, the term of this patent is extended or adjusted under 35 U.S.C. 154(b) by 0 days.

(21) Appl. No.: 16/411,220

(22) Filed: May 14, 2019

(51) Int. Cl.
*G01Q 60/38* (2010.01)
(52) U.S. Cl.
CPC .................................... *G01Q 60/38* (2013.01)
(58) Field of Classification Search
CPC ....................................................... G01Q 60/38
See application file for complete search history.

(56) References Cited

U.S. PATENT DOCUMENTS

2011/0277556 A1* 11/2011 Peecock ................ G01L 5/0033
73/827

\* cited by examiner

*Primary Examiner* — Nicole M Ippolito
*Assistant Examiner* — Hanway Chang
(74) *Attorney, Agent, or Firm* — Felix L. Fischer

(57) ABSTRACT

This specification discloses a method and implementations improving the field of holding or mounting Scanning Probe Microscopy probe tips for use and alignment. Specifically, the invention allows probes to be mounted replaceably to a very small SPM actuator and aligned in 5 axis permitting alignment of cantilever to beam and reflected beam to detector. The invention allows for great simplification of SPM design while allowing reduction in sizes and masses of tip mounting apparatus thereby improving performance.

12 Claims, 5 Drawing Sheets

SCANNED PROBE MOUNTING DESIGN

BACKGROUND

Field

Implementations of the disclosure relate generally to the field of scanned probe microscopy (SPM) and specifically to the art of aligning, mounting, design, and replacement of disposable probes of the optical lever sensor type.

Related Art

In the field of SPM, the majority of probes are made with a MEMS process comprising a microns long sharp probe tip, a 40 to 500 microns long cantilever with one end holding said tip and the other end fixed on a substrate of glass, circuit board (PCB), metal, or silicon that is of millimeter scale. Although with respect to use in a SPM, only the cantilever and tip are functional. The substrate is of millimeter scale historically to allow mounting of the probe into a clip, vacuum mandrel, to allow for tweezer manipulation by hand and for transport and storage. The substrate support element is also used to either precisely register the probe to the mount if the mount has been precisely designed with matching registration elements or more commonly to roughly align it into the clip opening. In the design of vacuum mounting, there is a positioning means whereby the probe is aligned to the optical beam prior to pulling vacuum and the substrate acts as a surface to register and pull vacuum against.

A standard substrate is roughly 300 microns thick, 1.6 mm wide, and 3.4 mm long in the long axis of the attached cantilever. The cantilever is roughly one order of magnitude smaller in each dimension. The probe comprising substrate, cantilever, and tip is attached to a SPM head allowing alignment of an optical beam onto the backside of the cantilever while the substrate is held in a spring clip or against a vacuum aperture which is referred to as a tip mount. If the SPM is designed to actuate the probe tip in all axis, it is referred to as tip scanning; whereas if the tip is not actuated, it is referred to as sample scanning. There are also designs in which the probe is actuated in the Z direction and the sample is raster scanned in the orthogonal X and Y directions which might be referred to as hybrid scanning. In the case of a tip scanning or hybrid design, the probe and its mount act as a payload mass. For the highest performance of these systems, it is desirable to reduce the payload mass.

Albrecht et. al. Discloses in U.S. Pat. No. 5,399,232 a method for batch fabrication of a probe tip where the cantilever and probe tip are molded into a Silicon wafer that has been patterned with etching. Another process produces an integral silicon probe, cantilever and substrate through etching of silicon wafer. The vast majority of SPM Probes are fabricated using a MEMS process in a wafer batch process. A review of those processes has been presented by Dr. Phil Russell on a microscope vendor's website and can be found at:
https://www.agilent.com/cs/library/slidepresentation/Public/AFM%20Probe%20ManufacturingNanoworld_tip_technologyPRussell07.pdf The processes discussed are well known in the art of SPM probe manufacturing. In this method of SPM probe manufacturing, the substrate must be considerably larger than the cantilever and probe tip portion to allow for handling, holding, and mounting of probes. Handling of probes is typically done by hand with tweezers and it would be impossible to manipulate a SPM cantilever directly without the millimeter sized substrate.

As is common in the art of SPM tip mounts using spring clips are made from a variety of metals. It is undesirable to use clips in several measurements, particularly in liquids as contamination of sensitive electrolytes or electrochemical interactions may interfere with measurement results. Furthermore, clips may interfere with electrical measurements either by stray capacitive loading, current leakage, resistive, or bimetallic voltaic effects. Additionally, the clip must extend below the surface of the substrate and may interfere with the sample. The clip's protrusion into the space between the probe and sample has resulted in inclination of the tip relative to the sample plane. The millimeter length of the substrate and a roughly 10 degree inclination provides sufficient but minimal clearance for the clip. If the area of interest to be imaged is in a recessed area, the clip and tip mount may interfere with the side walls. Current state of the art clips only allow reference to the tip mount fixed plane.

Vacuum holding of an SPM tip overcomes some of the clearance issues of spring clips by only engaging with the top of the substrate. The disadvantages of this technique are incompatibility with any liquids or operation in low pressure of vacuum. In U.S. Pat. No. 5,705,814 Young et. al. disclose a design for automated probe exchange which comprises using a vacuum to hold the probe and routines for alignment. Furthermore, the minimum size of the substrate must also be large enough to establish sufficient vacuum holding force.

It is a common issue to those of ordinary skill in replacement and handling of silicon, silicon nitride, and glass substrates to break off small pieces of the crystal which will contaminate the mount and interfere with proper seating of the substrate in its mount. Improper probe seating is extremely common and endemic to the art and affects sensitive measurements of a cantilevers AC properties such as shifting its amplitude vs. frequency curve and the associated phase, amplitude, and frequency stability.

Wood et. al. Disclosed a method and process of creating eutectic balls used as semiconductor contracts and mounting in U.S. Pat. No. 3,663,184. Hantschel et. al. in European patent 1189016 proposes attaching metal molded probes and cantilevers to substrates using forms of solder in order to provide rigid mount and conductive connection to the substrate that will be held in a clip. Fouchier discloses a bonding process whereby separately fabricated cantilever and probe tip units may be bonded to a carrier substrate that may then be transferred to an AFM tip holder in European patent EP1544865.

All forms of optical lever require alignment for the optical path from source reflecting off the back of the cantilever and back to the photodetector. Split photodetectors with two or four quadrants are commonly used in the art. Erickson et. al. disclose a fiber optic source and detection method requiring alignment for optimal performance in U.S. Pat. No. 9,366,395. With the vacuum holding method, the first leg of the path is aligned but the reflected beam to the detector must be aligned. For conventional SPM design, both legs of the beam path are aligned using various physical adjusters and optical components as is well known in the art. If the probe mounting means allowed for angular adjustment, the adjuster mechanisms can be removed from the SPM instrument and offloaded into the exchange mechanism thereby improving performance in the SPM. The changes in design lead to other improvements such as reduced drift, noise, and increased scanner resonance which would be highly beneficial.

SUMMARY OF THE INVENTION

In light of the limitations in the art, mounting methods which allow placement of SPM probe tips including possible reduction of the substrate size, substantially perfect coupling to the tip mount, without using a protruding spring clip or vacuum attachment which furthermore may not have the potential to contaminate a liquid electrolyte sample while allowing electrical contact if desired with minimum negative electrical measurement parasitic loss and allowing optical beam alignment during the mounting process would be desirable. A bonding agent such as a thermo-plastic resin may be added on the underside of the AFM tip mount and heated to replaceably mount a tip using no spring or vacuum mechanism with extremely low added mass and clean contact; Silver particles may be added to the thermo-plastic to achieve a conductive attachment. Low temperature alloy may be used to attach probes in a similar fashion with the added benefit of strength and conductivity. Also, a mechanism is disclosed whereby adjustment is done via a gimbal stage holding the probe to be mounted on the AFM including a heating element for flowing the attach material while allowing the probe alignment before cooling.

Additional implementations disclose both a novel kinematic aligning clip mechanism which allows angular adjustment using attachment with materials in the forms of Eutectics. Conductive coatings such as Nickel and Gold are added to the probe and bonding to a Eutectic solder either added to the probe existing on the AFM tip mount.

The features, functions, and advantages that have been discussed can be achieved independently in various implementations of the present invention or may be combined in yet other implementations further details of which can be seen with reference to the following description and drawings.

DETAILED DESCRIPTION

Figure 1:
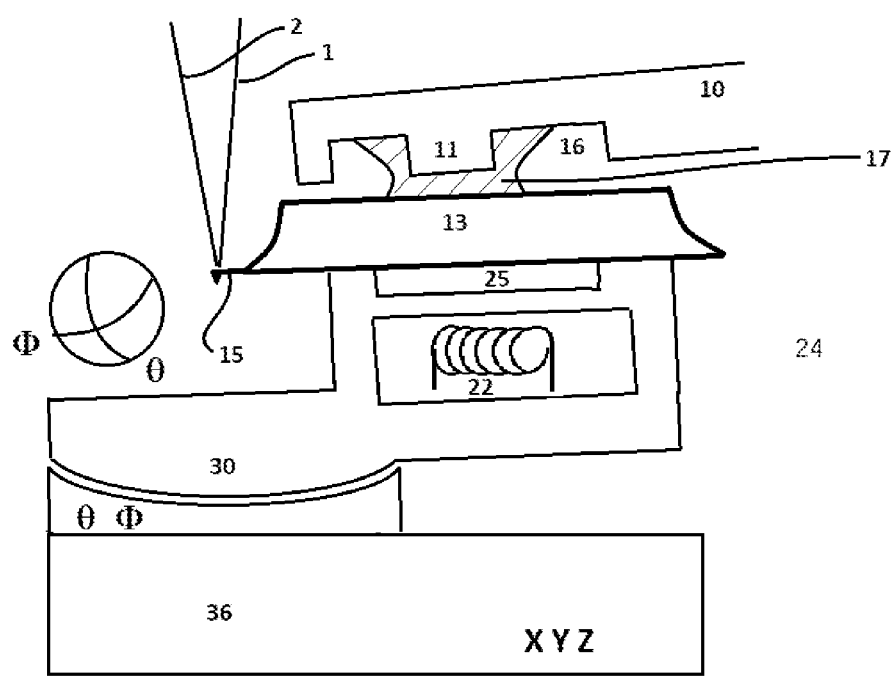
FIG. 1 Thermoplastic tip mounting with angle adjustment in tip exchange mechanism.

In a first implementation shown in FIG. 1, a releasable bonding element, a thermoplastic 17 for an exemplary implementation, is disposed between tip mounting arm 10 and probe mount substrate 13 which is temporarily held with a five axis positioning system 24 employing a vacuum chuck 25 disposed on a two axis gimbal stage 30 whose rotational center is ideally at the height of an AFM cantilever 15 extending from the probe mount substrate 13 thereby minimizing translation while tilting the probe is used to place the probe mount substrate into contacting proximity with the releasable bonding element. A heating element 22, integrally placed adjacent the vacuum chuck 25, is employed to melt the thermoplastic. The heating element may also be disposed upon the tip mounting arm however this arrangement is generally less favorable due to the requirement to provide electrical connection of the heating element as well as its bulk and mass would be added to the AFM head payload. The gimbal, heater, and tip vacuum chuck are manipulated by a three axis micrometer stage 36 in the five axis positioning system which is ideally motorized and or automated to allow for the fastest tip exchange performance. The tip mounting process that has worked the best in our tests is to first pick up a probe with the vacuum chuck and manipulate the probe mount substrate coarsely with the cantilever 15 under the source optical beam 1 at its rough focus height and using the gimbal stage, tilt the probe mount substrate to point the reflection 2 of the source optical beam from the cantilever 15 into the center of the detector or desired alignment. With the probe mount substrate tilt aligned, use the three axis manipulator to translate the probe mount substrate back and up close to the tip mounting arm and align the source beam to be reflecting off the cantilever, turn on the heating element to melt the thermoplastic and fine adjust the probe mount substrate in contacting proximity with the thermoplastic to maximize alignment with small adjustments in translation and tilt to final align the probe. Turning off the heating element will allow the thermoplastic to freeze and harden and turning off the vacuum will allow the alignment apparatus to be moved away without disturbing the tip mounting arm and the newly aligned probe mount substrate which is now ready for use.

There are quite a few thermoplastic resins that may be used to suit the application. The simplest one is known by the trade name Crystalbond 509. The main component is a polymer precursor component called phthalic anhydride with a few percent of ethanol added. This thermoplastic monomer resin melts and solidifies easily at roughly 120 C and will not contaminate electrolytes. Furthermore, it dissolves in acetone so is easily cleaned. Its weakness however is that it softens at 30 C and therefore will cause apparent drift at temperatures just above room temperature or envivo fluid electrolytes. The resin can also be mixed with metal powder (we've used silver and aluminum) to provide electrical contact between the probe and tip mount. The resin can be cleaned with acetone. Another thermoplastic is available under the tradename Aquabond 85. This material has a higher stability at elevated temperatures but to 50 C and therefore is compatible with most AFM measurements. It can be removed by cleaning in hot deionized water. Another common material that can be used is known as dopwax softens at 45 C, is inexpensive, and readily available and used to mount gemstones for cutting and polishing. Each of these thermoplastics will bond the tip substrate securely, provides great coupling for oscillating the cantilever and can be reused many times.

When a tip substrate needs to be replaced, it can be unbonded by bringing the vacuum chuck of FIG. 1 or similar apparatus back into coarse alignment to the probe substrate, turning on heating element and vacuum until the thermoplastic flows and releases the probe bond. When this process takes place, some of the thermo plastic will stay on the probe and some will remain on the tip mount. Because it only requires a tiny amount to securely hold the probe and the resin is virtually unchanged with heating and cooling, the probes may be replaced many times without adding new material. In order to increase the available resin or wax for bonding, a reservoir 16 may be patterned, etched, or machined into the tip mounting arm. The reservoir allows material to be temporarily stored on the tip mount and structurally, the tip mounting finger 11 remaining will have more than enough strength to securely hold the substrate.

Figure 2A:
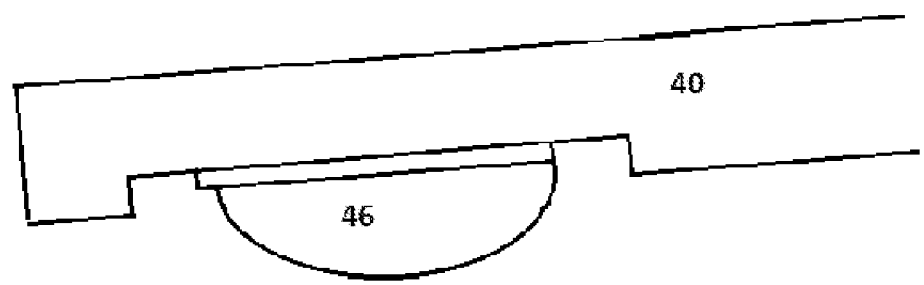
FIGS. 2A 2B 2C Metallic tip mounting on bare and metal coated probes.
Figure 2B:
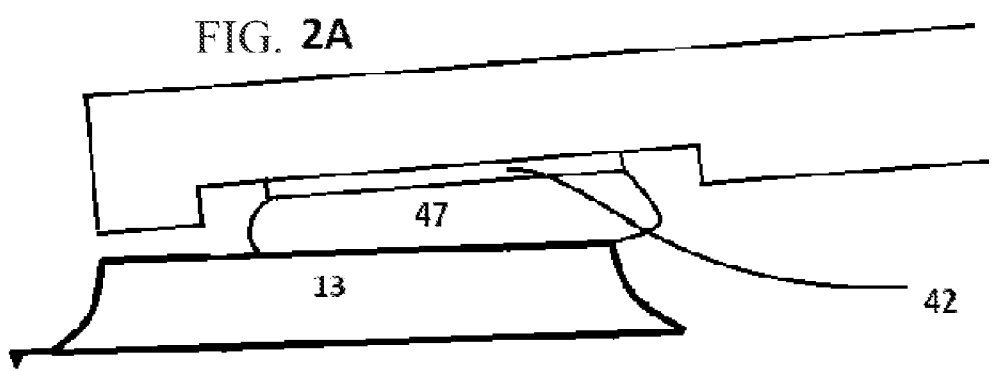
Figure 2C:
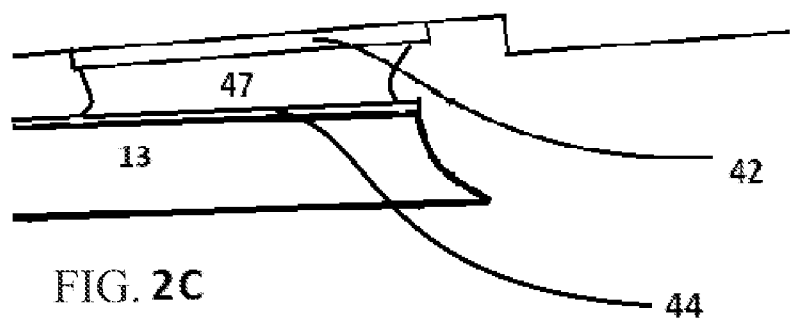

In a second implementation the releasable bonding element employs low melting temperature alloys or eutectics are used instead of thermoplastic. These metals may be used for mounting AFM tips in the same method as the first implementation with all the benefits described. FIG. 2A shows a tip mounting arm 40 with a metallic pad 42 whetted with a bead of low melting temperature metal alloy 46. The bead of low melting temperature alloy will conform to the pad and will retain much the same shape in both solid and liquid state. To mount a probe, first the substrate vacuumed to the heated apparatus of the first implementation described above but with a higher temperature as provided by increasing current to the heating element. Second, the substrate is brought into contacting proximity with the frozen bead of low melting temperature alloy. The low melting temperature alloy will soften and melt quickly particularly using silicon tip mounting substrates given the very high heat conductivity of silicon. When the low melting temperature alloy is melted, it will form a meniscus, taking the shape of either FIG. 2B or 2C depending upon whether the probe is metal coated or bare silicon. FIG. 2B shows a cantilever substrate aligned and releasably bonded with melted and frozen meniscus of low melting temperature alloy 47. The shape of the meniscus of frozen alloy in the figure is characteristic of a non-whetted probe mount substrate which is typical of bare silicon (not metal coated) where the meniscus only forms an intimate bond without any intermetallic at the substrate-metal interface. FIG. 2C shows a frozen low melting temperature allow meniscus 47' that has whetted on the probe mount substrate due to metal coating 44. The process of alignment and attachment of the probe mount substrate is identical to that of thermoplastic bonding described above. For electrical measurements with an AFM, using metal instead of thermoplastic is preferred.

Roto144, which is also called Field's Metal, has been employed in exemplary implementations. It acts like an extremely low temperature solder so that if the metallic pad is defined for instance on a printed circuit board, beryllium copper spring, or other metal a small blob of the alloy can be whetted once with some solder flux and then cleaned and used many times to attach probe mount substrates. The process works for bare silicon, silicon nitride, glass, or any of the proceeding with metallic coatings. While the adhesion to uncoated probes can be overcome with strong shear forces such as grabbing with tweezers, normal use of scanning and imaging will not break the adherence. Bonding to probes with metal coatings are not removable without re-melting the alloy due to the strong bonds. If higher temperature operation of the AFM is desired, there is a virtual panoply of melt temperatures of alloys. Test implementation have employed a variety of these alloys with almost identical results. Alloys with melt temperatures ranging from 47 C to 170 C are composed of varying concentrations of Bismuth, Cadmium, Lead. Tin, and Indium and readily available from multiple sources under names such as RotoMetal, Cerrobend, and CS alloys. Higher temperatures may be achieved with gold, tin and lead eutectic alloys.

Suitable coatings on probe mount substrates ideally will provide good whetting of the alloy while also acting as a great reflector for the back side of the cantilever. Typical coatings are 10 to 100 nm thickness of Aluminum or Gold over a very thin, 1 to 10 nm thickness adhesion layers of Nickel or Chromium. These types of coatings are readily available on AFM probes from multiple vendors with recipes for coating these probes commonly known in the art of AFM.

Figure 3A:
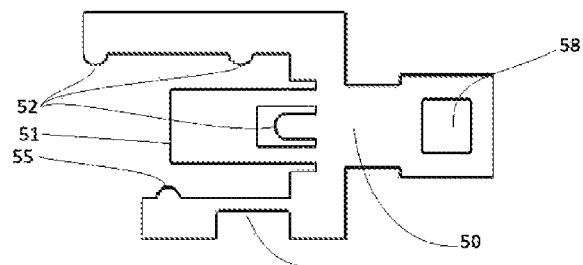
FIGS. 3A 3B 3C and 3D Miniature Clip design mounting allowing angular adjustment.
Figure 3B:
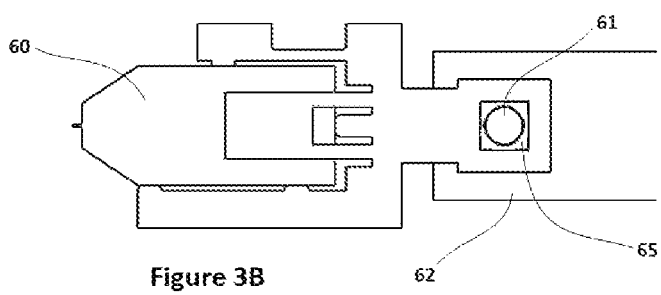

Turning to an additional implementation shown in FIGS. 3A-3D, a novel clip design shown from the top in FIG. 3A and from bottom in FIG. 3B is disclosed which provides kinematic mounting to standard silicon probes while also allowing angle adjustment. The part 50 is constructed out of sheet metal preferably tempered Beryllium Copper alloy as is well known in the art of springs but may also be constructed from Stainless Steel Sheet or other metals. Its shape can be made with a die cutter, electro-chemical etch, or laser cutting and then the bottom tab 51 is stamped in a press to bend it down as is well known in the art of sheet metal working. Fixed kinematic points 52 reference the 54 degree side walls of standard Silicon probe tip substrates and a spring arm 53 is formed to provide clamping force with an opposing sprung kinematic point 55 on the opposing 54 degree side wall of the probe substrate. The tab, three fixed kinematic points and the sprung kinematic point provide complete constraint for a standard Silicon probe substrate 60.

Figure 3C:
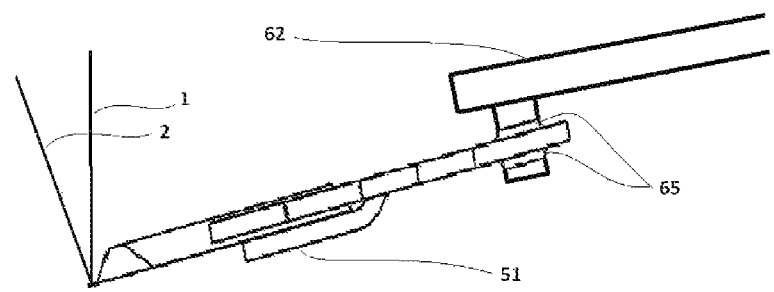
Figure 3D:
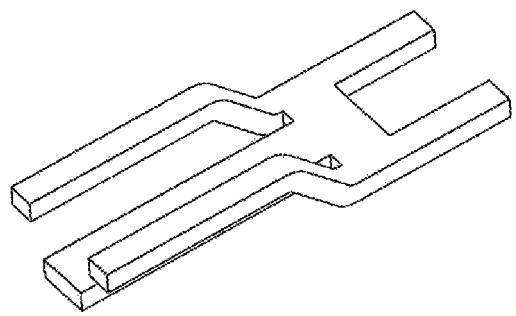

In order to provide adjustability, an aperture in the clip is formed that is a larger than a pin 61 protruding below the tip mount 62 as can be seen in the side view of FIG. 3C. The releasable bonding element is provided by Eutectic Solder 65 melted between the pin and aperture in the tip mount while the position of the clip is adjusted according to the procedure described in the previous implementations. The addition of the adjustability allows the optical beams to be adjusted simplifying the AFM optics design as previously described. While the clip shown in FIGS. 3A-C is a preferred implementation for use with standard etched silicon probe substrates with tapered sides, a simpler clip design with only upper and lower stamped arms as shown in FIG. 3D maybe used to hold a wider variety of probes without the tapered edges or those made with glass substrates. Clips and their manufacturing are well known in the art and many variations can work suitably.

Figure 4A:
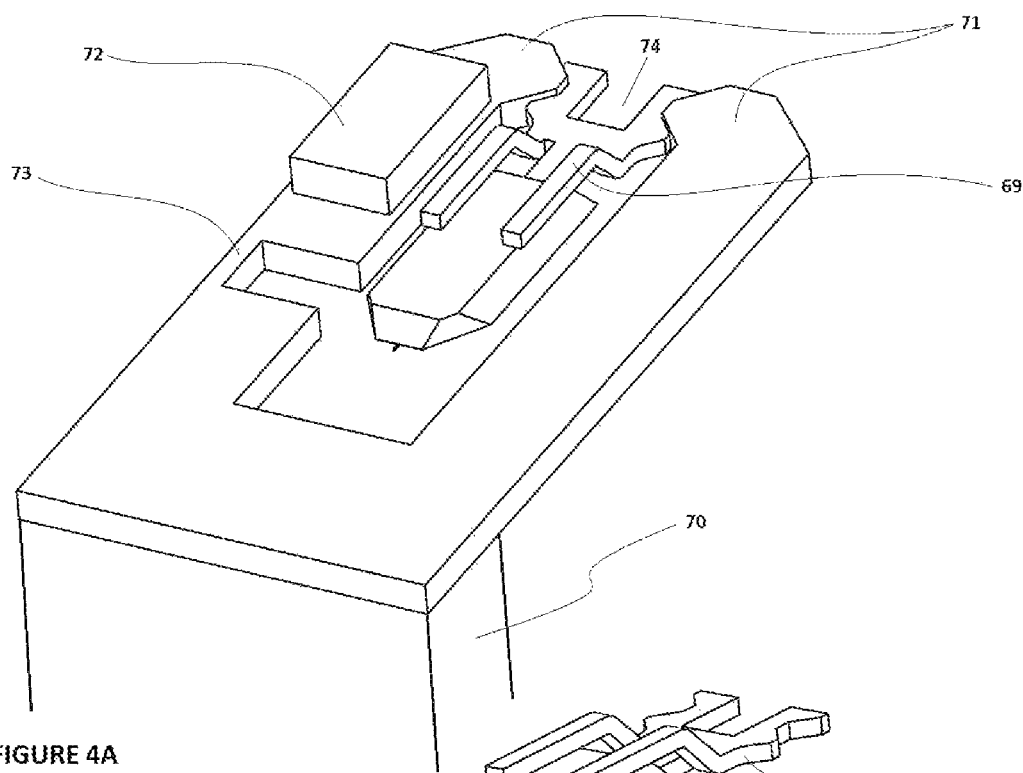
FIGS. 4A 4B Tip Exchange Mechanism designed to work with a miniature clip.
Figure 4B:
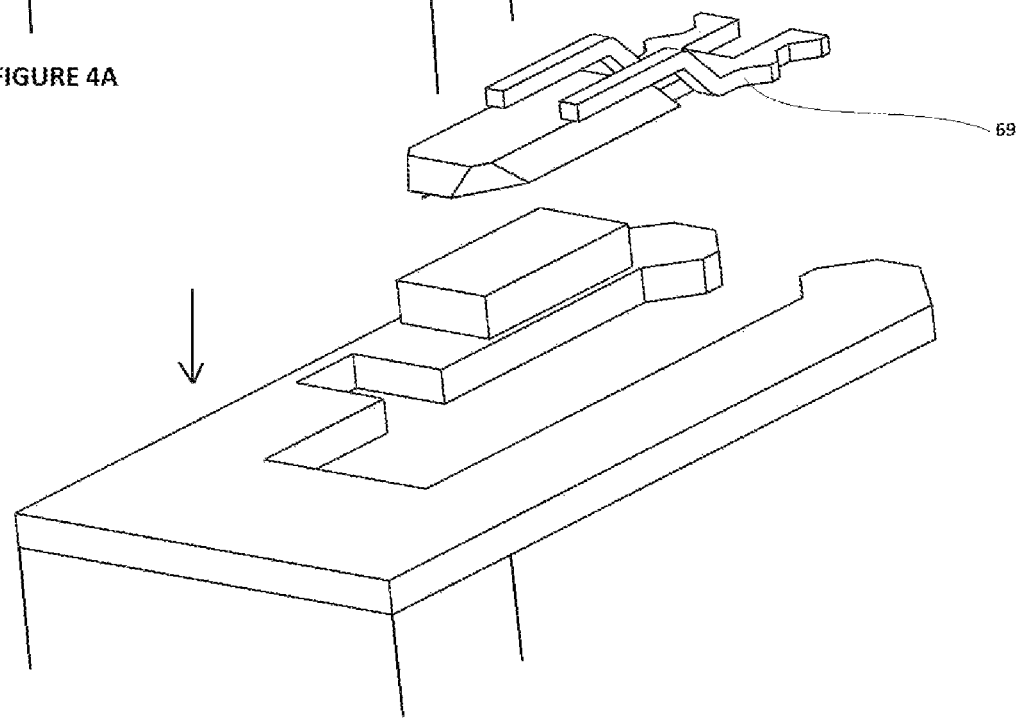

While the methods of alignment and mounting of the clip to the tip mount arm of the previous figures are essentially identical to the first two implementations, the vacuum chuck needs to be replaced with a mechanical holding method. FIG. 4A shows an apparatus comprising a mechanical clamp which replaces the vacuum holding method of the previous implementations. A clamp arm 70 which would replace the vacuum chuck of FIG. 1 contains a simple mechanical spring 73 which holds clip 69 between a pair of jaws 71. A heater 72 is attached to one of the jaws. Clamp arm 70 is mounted to a two axis gimbal stage as described in previous implementations. The jaws 71 clamp around an aperture 74 in the clip that would be placed over the pin 61 on the tip mount from FIGS. 3A-3D. Ideally, the jaws are symmetric about the pin so as to securely hold the clip without applying torque. FIG. 4B shows the mechanical clamp lowered after mounting by simply retracting downward to release.

Figure 5A:
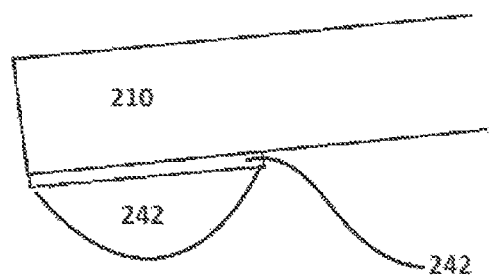
FIGS. 5A 5B 5C and 5D show a modification of SPM Probe design to allow reduction in probe assembly size.
Figure 5B:
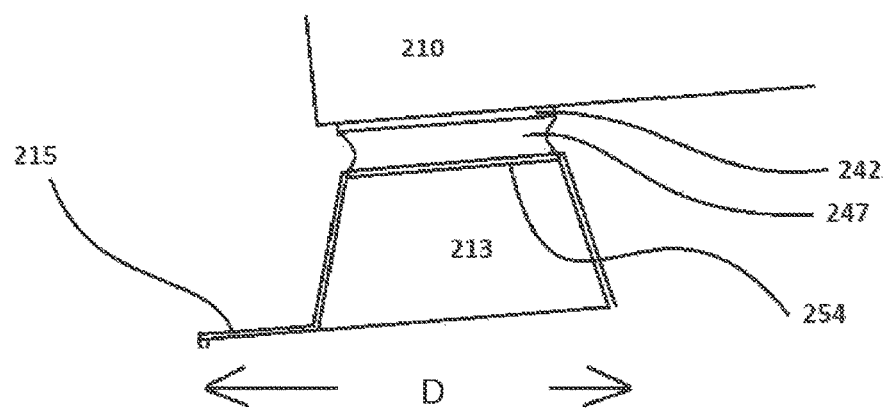

An alternative use of the present invention allows for a variety of significant benefits to the current state of the art of SPM probe manufacturing as well as tip mounting on Scanned Probe Microscopes. Turning to FIG. 5A a tip mounting arm 210 contains a bond pad 242 upon which has been applied a metal eutectic alloy 247. Further, in FIG. 5B an AFM probe has been fabricated with a substantially smaller substrate 213 such that it might not be able to be manipulated by hand tweezers. The lateral extent D of such a substrate, as shown in FIG. 5B, is equal to or less than one millimeter. The substrate and cantilever 215 may have been coated with metal coating 254, which as discussed before might be Aluminum, Gold, Nickel, Platinum Iridium, or other coating in the range of 10 to 200 nano-meters thickness. The manipulator as described in FIG. 1 would be unchanged with the exception that a portion of the batch fabricated wafer would be held by the vacuum chuck in place of a single probe tip substrate. In this embodiment, the areal density of fabrication would yield substantially more probes per wafer and therefore lower cost per disposable tip. Furthermore, the tip mounting arm is of considerably smaller extent and the combination of mounted tip substrate and arm comprise less mass and are therefore easier to actuate.

Figure 5C:
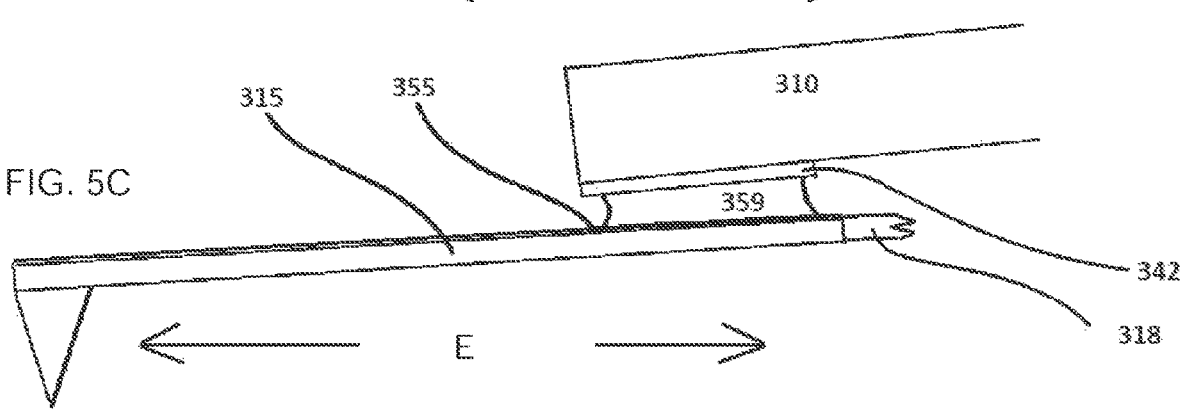
Figure 5D:
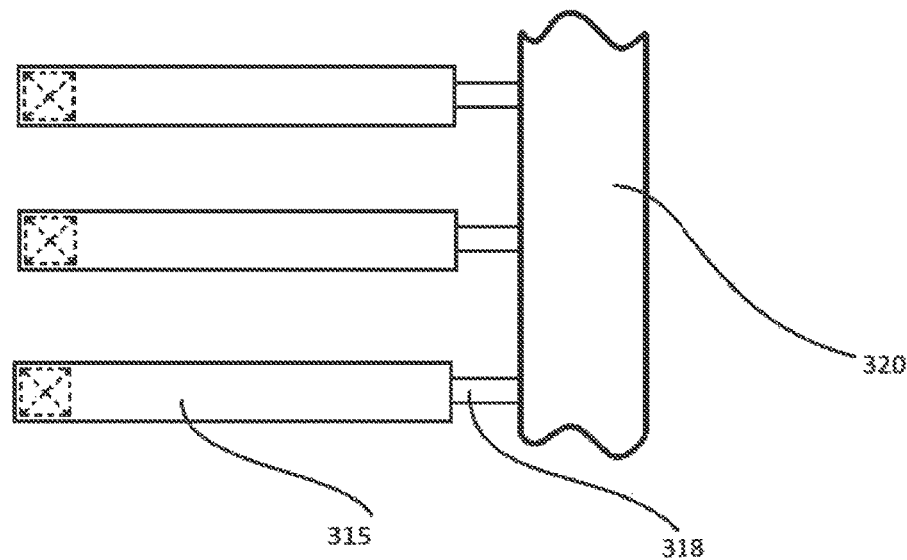

FIG. 5C shows the substrate reduction process taken to its conclusion of divesting the probe of any substrate. A cantilever mounting arm 310, having a dimension E of micron size (10-999 microns), contains a metal bonding pad 342, also of micron size. An AFM cantilever 315, also of micron size and coated with metal coating 355, is bonded to the metal bonding pad 342 by metal bonding eutectic 359 as the releasable bonding element. While the drawing shows a metal bonding pad element, the technique works without such defined pad where the eutectic or releasable bonding agent simply adheres to the cantilever directly. Shown near the metal bond is break off element 318 which is initially used to hold and position the cantilever connecting it to the support bar 320 with which it is fabricated, as shown in FIG. 5D. For mounting the AFM cantilever 315 to the cantilever mounting arm 310, the support bar 320 is constrained by the vacuum chuck 25 of the five axis positioning system 24. The five axis positioning system 24 positions the AFM cantilever 315 within contacting proximity of the metal bonding eutectic 359 on the cantilever mounting arm 310. As previously described for earlier embodiments, with the cantilever mounting arm 310 tilt aligned, the five axis positioning system is used to translate the support bar 320 and AFM cantilever 315 back and up close to the cantilever mounting arm 310 and align the source beam to be reflecting off the AFM cantilever. The heating element is turned on to melt the metal bonding eutectic and the five axis positioning system is used to fine adjust the AFM cantilever in contacting proximity with the metal bonding eutectic to maximize alignment with small adjustments in translation and tilt to final align the probe. Turning off the heating element will allow the metal bonding eutectic to freeze and harden. The five axis positioning system is then moved to fracture the break off element 318. In certain embodiments the break off element 318 may be a tab having a reduced area neck to create a fracture zone. In alternative embodiments, the break off element may be an extension of the AFM Cantilever 315 which fractures between the metal bonding eutectic 359 and the support bar 320. The support bar 320 may then be moved away without disturbing the cantilever mounting arm 310 and the newly aligned AFM cantilever 315, which is now ready for use. The probe areal density for such an array of cantilevers with no substrate required will be at least two orders of magnitude higher than current standard batch wafer AFM probe manufacturing. The resulting improvements in performance due to mass and size reduction and the reduction in consumable probe cost and therefore operational cost of atomic force microscopes will be dramatic. Because the substrate is no longer necessary, the cantilevers which comprise less than 1% of the area taken by a state of the art probe, cantilever, and substrate, a typical wafer of probes can, with this arrangement, comprise roughly 100× the number of probes and therefore the cost should be reduced by more than a factor of 10 per probe. Furthermore, the mass of a cantilever is less than one ten thousandths of the mass of existing probes. The reduction in its mass and the mass and extent of the mounting arm will yield far higher speed scanning possibilities.

Having now described various implementations of the invention in detail as required by the patent statutes, those skilled in the art will recognize modifications and substitutions to the specific implementations disclosed herein. Such modifications are within the scope and intent of the present invention as defined in the following claims.

What is claimed is:

1. A scanned probe mounting method comprising:
providing a tip mounting arm having a releasable bonding element;
engaging the probe mount substrate with a positioning system adapted to engage a probe mount substrate;
orienting the probe mount substrate in contacting proximity to the releasable bonding element with the positioning system;
heating the releasable bonding element with a heater to melt the releasable bonding element;
allowing the releasable bonding element to freeze; and,
releasing the probe mount substrate from the positioning system.

2. The scanned probe mounting method as defined in claim 1 wherein said positioning system is a five axis positioning system.

3. The scanned probe mounting method as defined in claim 2 wherein the steps of orienting the probe mount substrate and heating the releasable bonding element comprise:
manipulating a three axis micrometer stage in the five axis positioning system for coarse positioning of the engaged probe mount under a source optical beam;
tilting the probe mount substrate to point a reflection of the source optical beam from a cantilever extending from the probe substrate into the center of a detector or desired alignment using a gimbal stage in the five axis positioning system;
with the probe mount substrate tilt aligned, translating the three axis micrometer stage to position the probe substrate proximate the mounting arm;
turning on the heating element to melt the releasable bonding element; and,
positioning the substrate in contacting proximity to the releasable bonding element.

4. The scanned probe mounting method as defined in claim 2 wherein the five axis positioning system employs a vacuum chuck for engaging the probe substrate.

5. The scanned probe mounting method as defined in claim 4 wherein a clamp arm has a mechanical spring engaging the clip between a pair of jaws, and the heater is attached to one of the jaws, and said clamp arm is mounted to the five axis positioning system.

6. The scanned probe mounting method as defined in claim 1 wherein the releasable bonding element is a thermoplastic.

7. The scanned probe mounting method as defined in claim 1 wherein the releasable bonding element is a low temperature alloy.

8. The scanned probe mounting method as defined in claim 1 wherein a sheet metal clip has a bottom tab to engage a base of the probe mounting substrate, two fixed kinematic points adapted to engage a side wall and a third fixed kinematic point adapted to engage an end wall of the probe substrate and a spring arm to provide clamping force with a sprung kinematic point on an opposing side wall of the probe mounting substrate, said clip having an aperture adapted to receive a pin extending from the tip mounting arm, said releasable bonding element engaging the pin in the aperture.

9. The scanned probe mounting method as defined in claim 1 wherein a lateral extent of the substrate is less than or equal to one millimeter.

10. The scanned probe mounting method comprising:
   engaging a support bar on which an AFM cantilever is mounted with a positioning system;
   orienting the AFM cantilever in contacting proximity to the releasable bonding element with the positioning system;
   heating the releasable bonding element with a heater to melt the releasable bonding element;
   allowing the releasable bonding element to freeze;
   fracturing a break off element from the AFM cantilever; and,
   moving from the positioning system from proximity to the cantilever mounting arm.

11. The scanned probe mounting method as defined in claim 10 in which the AFM cantilever is of micron size.

12. The scanned probe mounting method as defined in claim 10 in which the cantilever mounting arm is of micron size.

\* \* \* \* \*